Patented Jan. 7, 1941

2,227,654

UNITED STATES PATENT OFFICE 2,227,654

1-ARYL-5-METHYL-3-PYRAZOLONES

Hans Z. Lecher, Plainfield, Robert P. Parker, Somerville, and Robert C. Conn, Bound Brook, N. J., assignors to American Cyanamid Company, New York, N. Y., a corporation of Maine No Drawing. Application July 19, 1940,
Serial No. 346,324

9 Claims. (Cl. 260—310)

This invention relates to a new method of preparing 1-aryl-5-methyl-3-pyrazolones and to certain of them as new chemical compounds.

The compounds may be represented by the following general formula:

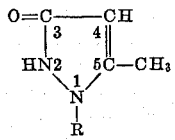

where R stands for an aryl radical which may be unsubstituted or substituted by one or more substituents such as alkyl, alkoxy, halogen, nitro, dialkylamino groups, and the like.

1-aryl-5-methyl-3-pyrazolones have in the past not achieved any considerable practical importance because they have not been readily available at a reasonable price as have their isomers the 1-aryl-3-methyl-5-pyrazolones. The only processes which have been used in the past have given relatively poor yields. An example of such a process is the condensation of N′-aryl-N-phenylhydrazines with ethylacetoacetate. It has also not been practical to prepare a 1-aryl-3-pyrazolone which could be methylated.

According to the present invention 1-aryl-5-methyl-3-pyrazolones are prepared by treating with aqueous acid an arylhydrazone of acetoacetic arylhydrazides having the formula:

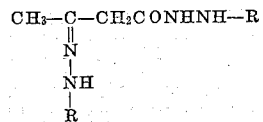

in which R has the same significance as in the formula of the preceding paragraph. The reaction produces a mixture of one molecule of the 3-pyrazolone and one molecule of the corresponding arylhydrazine which products can be readily separated as will be described below.

The arylhydrazones of the acetoacetic arylhydrazides are readily and economically prepared by reacting two moles of an arylhydrazine with one mole of diketene. This reaction is general with arylhydrazines and proceeds readily in good yields when carried out in an inert diluent or solvent. Different arylhydrazines require different temperatures for best results. In some cases, as with phenylhydrazine, the reaction is effected preferably with cooling, whereas with others, for example 2,5-dichlorophenylhydrazine in benzene the reaction proceeds better when the reaction is carried out at the boil. The hydrazide hydrazones produced are readily separated out by filtration as they are difficultly soluble in the inert diluent.

It is not exactly known just how the reaction of the present process proceeds and it is not intended to limit the present invention to any particular theory of action. It seems probable, however, that the reaction proceeds according to the following equations which are advanced as a probable explanation of the course of the reaction:

R—NH—NH—C—CH$_2$—C—CH$_3$+H$_2$O+HX ⟶
$\phantom{xxxxxxx}$‖$\phantom{xxxx}$‖
$\phantom{xxxxxxx}$O$\phantom{xxxx}$N
$\phantom{xxxxxxxxxxx}$|
$\phantom{xxxxxxxxxxx}$NH
$\phantom{xxxxxxxxxxx}$|
$\phantom{xxxxxxxxxxx}$R R—NH—NH—C—CH$_2$C—CH$_3$+R—NH—NH$_2$.HX
$\phantom{xxxxxxxx}$‖$\phantom{xxxx}$‖
$\phantom{xxxxxxxx}$O$\phantom{xxxx}$O

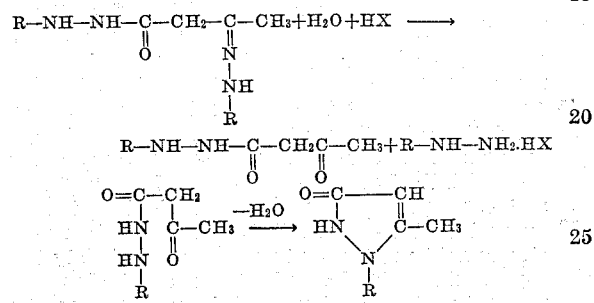

The symbol R has the same meaning as in the preceding formulae and X is used to designate the anion of an acid soluble in water.

The present invention is all the more surprising because anhydrous acids such as glacial acetic acid and aqueous alkalies such as a 20% solution of sodium hydroxide, result in the production of the 5-pyrazolones. The unexpectedness is further enhanced by the known fact that when diketene is reacted with hydrazines in an inert diluent at a sufficiently high temperature, the 5-pyrazolone isomers are produced. Aqueous acids, however, produce the 3-pyrazolones. The reason why aqueous acids behave differently from anhydrous acids and alkalies is not at present known definitely and it is not intended to limit the invention to any theory attempting to explain this anomalous behavior of aqueous acids.

The aqueous acid which is used in the present invention should be strong in order to assure the production of the 3-pyrazolones without contamination by or with a minimum of the isomeric 5-pyrazolones. Without desiring to limit the present invention to any particular acid strength we prefer to use acids comparable in strength to 5N mineral acids although the preferred strength will vary to some extent with the different hydrazone hydrazides as well as the best temperature conditions. It should be understood that neither the acid concentration nor the temperature are critical and this is an advantage of the present invention, but in the case of every hydrazone hydrazide and acid there is an optimum of temperature and concentration. With the majority of the hydrazone hydrazides a moderately elevated temperature has been found to be advantageous and we prefer to carry out the reaction in most cases at the boil, although in some cases the reaction proceeds completely at lower temperatures. Using a suitable strength of acid the 3-pyrazolone is produced in excellent yield and has a high degree of purity.

As has been pointed out above, the reaction of the present invention results in a mixture of the desired pyrazolone with an equal amount of the corresponding arylhydrazine. The two products can be readily separated by various means. Thus, neutralization of the acid mixture results in precipitation of the pyrazolone whereas the hydrazine remains in solution and the pyrazolone can then be recovered by filtration and the hydrazine recovered from the filtrate if desired and reused with further amounts of diketene.

Another method of separation which also gives satisfactory results is to add an excess of alkali which results in dissolving the pyrazolone in the alkaline solution while leaving the hydrazine undissolved. Again the separation is effected by filtration or by extraction with a suitable solvent. The pyrazolone in the filtrate can then be recovered by neutralization of the alkaline solution which results in its precipitation.

In some cases a small amount of the corresponding isomeric 5-pyrazolone will be present. This can easily be separated because it is much more soluble than the 3-pyrazolone in both acid and alkali. Careful neutralization, for example, precipitates the 3-pyrazolone while leaving the 5-pyrazolone in solution. The separation is not difficult but of course any 5-pyrazolone produced will correspondingly reduce the yield of the 3-pyrazolone and hence it is preferable to use a strong acid preferably in excess so that only the 3-pyrazolone is formed. This eliminates the necessity of separation and hence reduces the cost of the process and constitutes, therefore, the preferred embodiment.

The 3-pyrazolones produced by the present invention are useful as intermediates in the preparation of azo dyestuffs and particularly metallized azo dyes since they couple with diazo compounds. They are also useful intermediates in the preparation of pharmaceuticals.

The invention will be described in greater detail in conjunction with the following specific examples in which the parts are given by weight. It should be understood that the examples are not intended to limit the invention but are typical of the process.

*Example 1*

Eighty-four parts of diketene are added during 1½ hours to a solution of 216 parts of phenylhydrazine in 2,160 parts of toluene with stirring and cooling below 10° C. Stirring is continued for two hours, after which the bulky precipitate is filtered and washed with additional toluene. The product is the phenylhydrazone of acetoacetic phenylhydrazide having the formula:

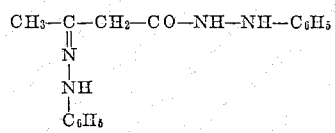

A slurry of 10 parts of this product in 84 parts of 38% hydrochloric acid is stirred and heated to the boil. After short stirring, 100 parts of water are added, a clear solution resulting. This is treated with decolorizing charcoal, filtered and made alkaline with an excess of sodium hydroxide. The resulting clear solution is made neutral with acetic acid whereupon 1-phenyl-5-methyl-pyrazolone-3 precipitates. This is filtered, well washed with water, and dried.

*Example 2*

A slurry of 10 parts of the phenylhydrazone of acetoacetic phenylhydrazide, prepared according to Example 1, in 85 parts of 5N sulfuric acid is heated with stirring to 70° C. at which temperature complete solution occurs. The solution is treated with decolorizing charcoal, filtered and made alkaline by the addition of excess sodium hydroxide. Acetic acid is added carefully so that precipitation of 1-phenyl-5-methyl-3-pyrazolone is complete without complete neutralization of the solution. This is filtered, well washed with water, and dried.

*Example 3*

A slurry of 10 parts of the phenylhydrazone of acetoacetic phenylhydrazide, prepared according to Example 1, in 200 parts of 20% acetic acid is stirred and heated to the boil. Complete solution does not take place, but there is a marked change in the character of the suspended solid. The reaction is stirred under reflux for 30 minutes and is then cooled, additional material crystallizing. The material is filtered and is well washed with water. It is further purified by taking up in dilute sodium hydroxide, warming with a little decolorizing charcoal and filtering. Sufficient acetic acid is added to make the solution just faintly alkaline to red litmus paper whereupon 1-phenyl-5-methyl-3-pyrazolone precipitates. This is filtered, well washed with water, and dried.

The original mother liquor yields some 1-phenyl-3-methyl-5-pyrazolone when it is neutralized with sodium carbonate.

*Example 4*

A solution of 33 parts of 2,5-dichlorophenylhydrazine in 44 parts of benzene is stirred at room temperature and 8.2 parts of diketene added. The reaction is stirred for 16 hours and filtered from the separated crystalline product. This is filtered and washed with benzene. The product is the 2,5-dichlorophenylhydrazone of acetoacetic-2,5-dichlorophenylhydrazide having the formula:

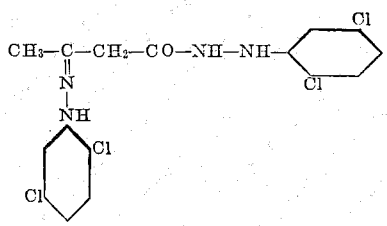

It is obtained as a white, flaky crystalline mat when recrystallized from benzene; M. P. 185.8°–186.5° C.

A slurry of 10 parts of this product in 91 parts of 5N hydrochloric acid and 8 parts of ethyl alcohol is stirred and heated to boiling. Solution is very rapid at this point. The clear solution is cooled and made alkaline with excess sodium hydroxide, 2,5-dichlorophenylhydrazine precipitating. This is removed by filtering. The filtrate is made neutral with acetic acid. The precipitate 1-(2',5'-dichlorophenyl)-5-methyl-3-pyrazolone is filtered, well washed with water, and dried. It crystallizes in the form of white plates from alcohol; M. P. 245°–246° C. (corr.). This has the following formula:

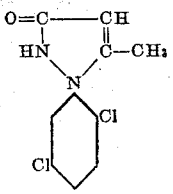

Example 5

A slurry of 15.3 parts of p-nitrophenylhydrazine in 380 parts of ethylene dichloride is stirred with cooling to 10° C. and 4.2 parts of diketene in 63 parts ethylene dichloride is added. The reaction is stirred for 16 hours, a bright yellow crystalline powder being formed.

This is filtered and washed with a little additional solvent, then with benzene. The product is the p-nitrophenylhydrazone of acetoacetic p-nitrophenylhydrazide having the formula:

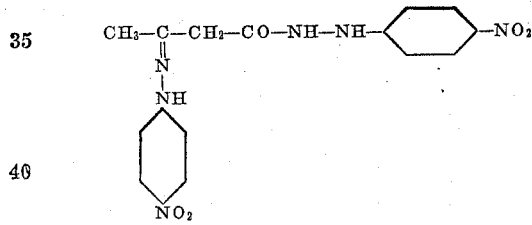

This is a yellow, crystalline powder, difficultly soluble in organic solvents. It melts, with decomposition, at 206° C.

A slurry of 10 parts of this compound in 91 parts of 5N hydrochloric acid and 8 parts of alcohol is stirred and heated to the boil, complete solution taking place. The resulting clear red solution is treated with decolorizing charcoal and filtered. The filtrate is treated with sufficient sodium hydroxide so that it gives only a faintly acid test to Congo red indicator paper. A heavy yellow precipitate of 1-(4'-nitrophenyl)-5-methyl-3-pyrazolone is obtained. This is filtered, well washed with water, and dried. It crystallizes from alcohol as fine, yellow, hair-like needles, M. P. 233°–234° C. (dec., corr.). It has the following formula

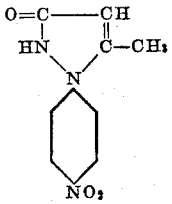

Example 6

A slurry of 15.8 parts of alpha-naphthalhydrazine in 263 parts of benzene is stirred and cooled to 10° C. 4.2 parts of diketene in 43.5 parts of benzene is added and the reaction stirred 16 hours, a heavy white precipitate separating. This is filtered and washed with benzene. The product is the alpha-naphthylhydrazone of acetoacetic alpha-naphthylhydrazide having the following formula:

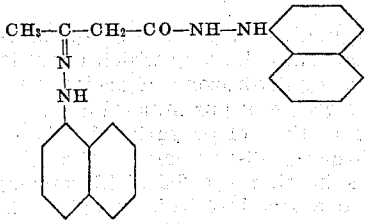

It is a white crystalline product, M. P. 158°–159° C. (dec.).

A slurry of ten parts of this product in 91 parts of 5N hydrochloric acid is heated with stirring to the boil. The resulting solution is treated with decolorizing charcoal and filtered. The filtrate is cooled and made alkaline with excess sodium hydroxide. Alpha-naphthylhydrazine remains undissolved and is removed by filtration. The filtrate is neutralized with acetic acid, 1-(alpha-naphthyl)-5-methyl-3-pyrazolone precipitating. This is filtered, well washed with water, and dried. It separates as a white, crystalline powder from hot alcohol, M. P. 240°–241° C. (corr.) It has the formula:

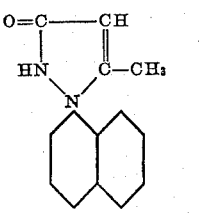

In the examples hydrochloric, sulfuric and acetic acid are shown as these are typical of the cheapest strong water-soluble acids, and may be considered as the preferred members for economical operation of the present invention. However, the invention is not limited to these acids and other strong water-soluble acids may be used. It is an advantage of the present invention that it is generally applicable with water-soluble acids although the results obtained will vary somewhat from acid to acid, particularly good results being obtained with hydrochloric acid and sulfuric acid.

We claim:

1. In a method for preparing 1-aryl-5-methyl-3-pyrazolones the step which comprises treating with aqueous acid a compound of the formula:

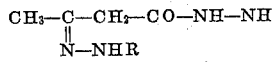

in which R is an aryl radical.

2. A method of preparing 1-aryl-5-methyl-3-pyrazolones which comprises treating with aqueous acid a compound of the formula:

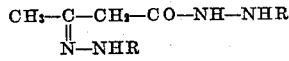

in which R is an aryl radical, neutralizing the acid solution, precipitating the pyrazolone and separating the precipitated pyrazolone from the mixture.

3. A method of preparing 1-aryl-5-methyl-3-pyrazolones which comprises treating with aqueous acid a compound of the formula:

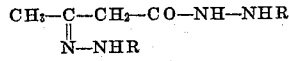

in which R is an aryl radical, making the acid solution sufficiently alkaline to dissolve the pyrazolone, separating the dissolved pyrazolone from undissolved hydrazine and recovering the pyrazolone from the alkaline solution by neutralization.

4. In a method of preparing 1-phenyl-5-methyl-3-pyrazolones the step which comprises heating the phenylhydrazone of acetoacetic phenylhydrazide with aqueous mineral acid.

5. In a method of preparing 1-(2',5'-dichlorophenyl-5-methyl-3-pyrazolone the step which comprises heating the 2,5-dichlorophenylhydrazone of acetoacetic-2,5-dichlorophenylhydrazide with aqueous mineral acid.

6. In a method of preparing 1-(4'-nitrophenyl)-5-methyl-3-pyrazolone the step which comprises heating the 4-nitrophenylhydrazone of acetoacetic-4-nitrophenylhydrazide with aqueous mineral acid.

7. A method according to claim 1 in which the mineral acid is at least 5N.

8. A method according to claim 1 in which the mineral acid is at least 5N and is present in excess.

9. A method according to claim 1 in which the reaction mixture is heated to complete reaction.

HANS Z. LECHER.
ROBERT P. PARKER.
ROBERT C. CONN.

CERTIFICATE OF CORRECTION.

Patent No. 2,227,654.   January 7, 1941.

HANS Z. LECHER, ET AL.

It is hereby certified that error appears in the printed specification of the above numbered patent requiring correction as follows: Page 2, second column, line 56, for the numeral "44" read --440--; page 4, first column, line 10, claim 5, for "phenyl-5" read -- phenyl)-5 --; and that the said Letters Patent should be read with this correction therein that the same may conform to the record of the case in the Patent Office.

Signed and sealed this 11th day of February, A. D. 1941.

(Seal)   Henry Van Arsdale,
   Acting Commissioner of Patents.